S. M. CURWEN.
CAR SEAT.
APPLICATION FILED SEPT. 11, 1920.
1,361,690.
Patented Dec. 7, 1920.
3 SHEETS—SHEET 3.
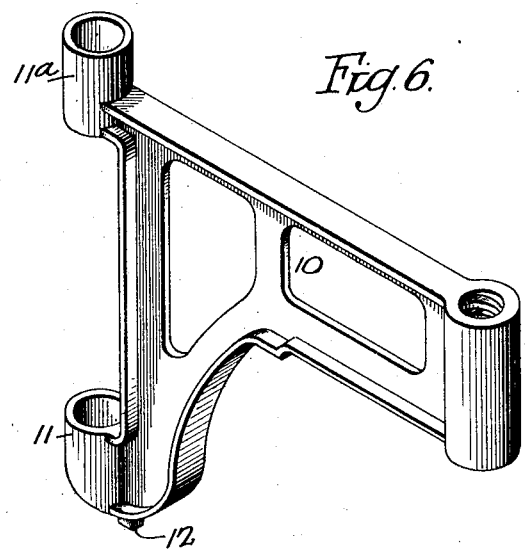
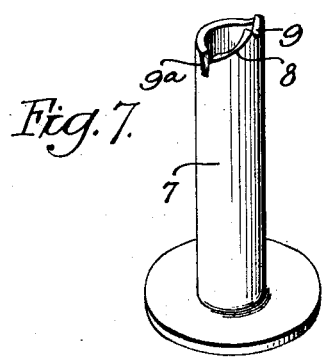
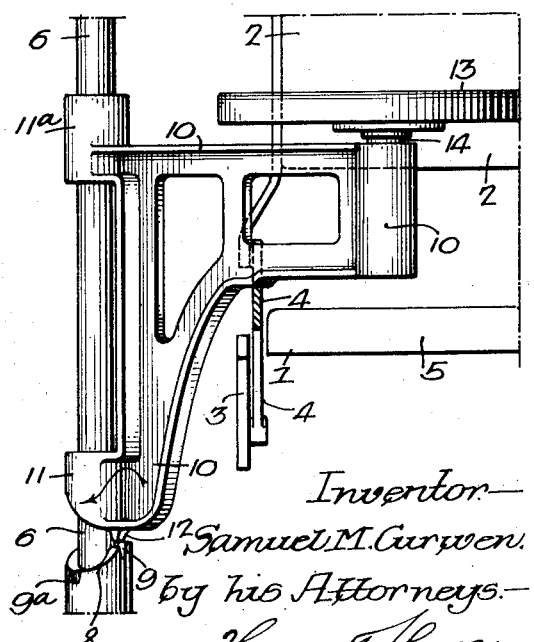

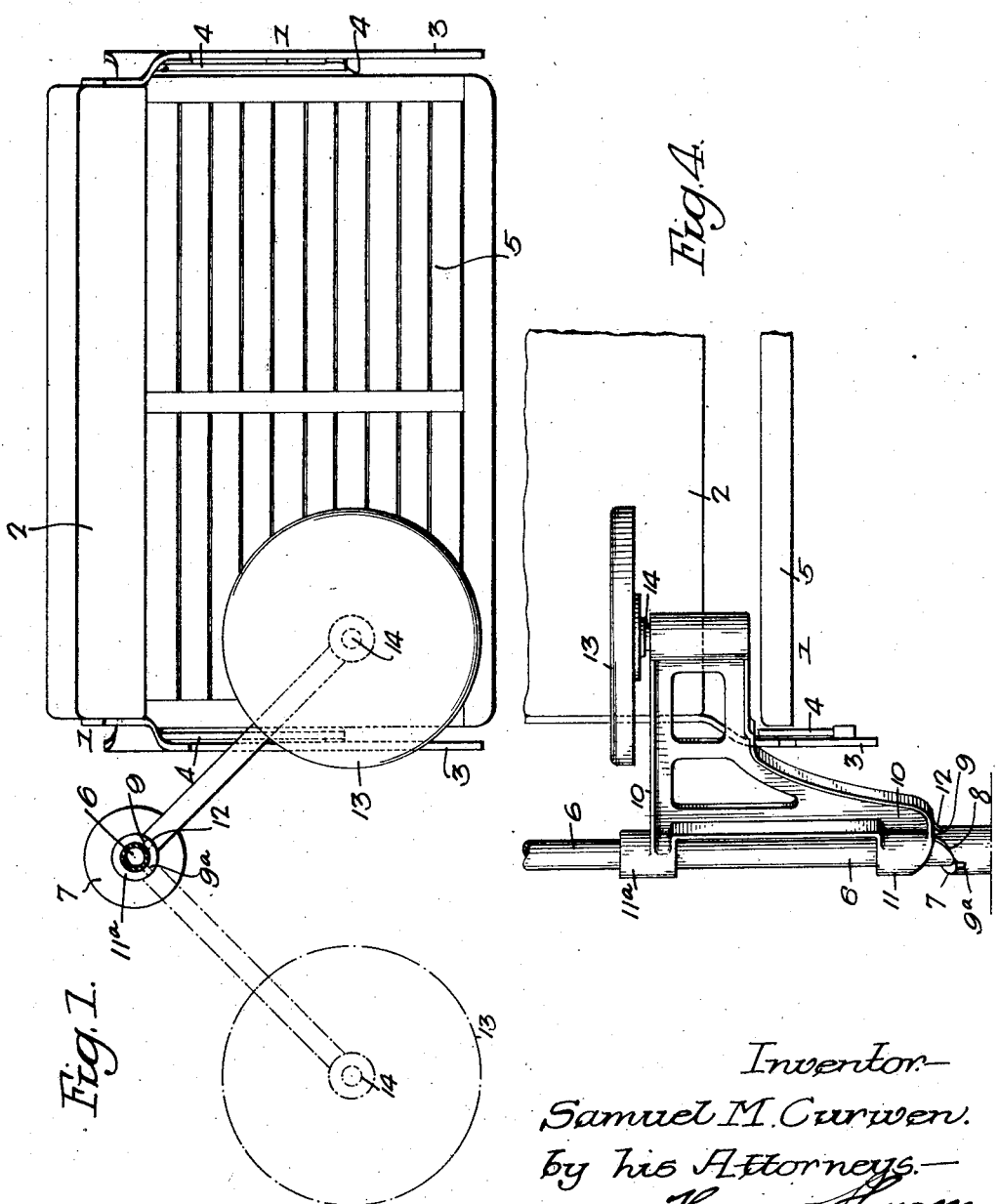

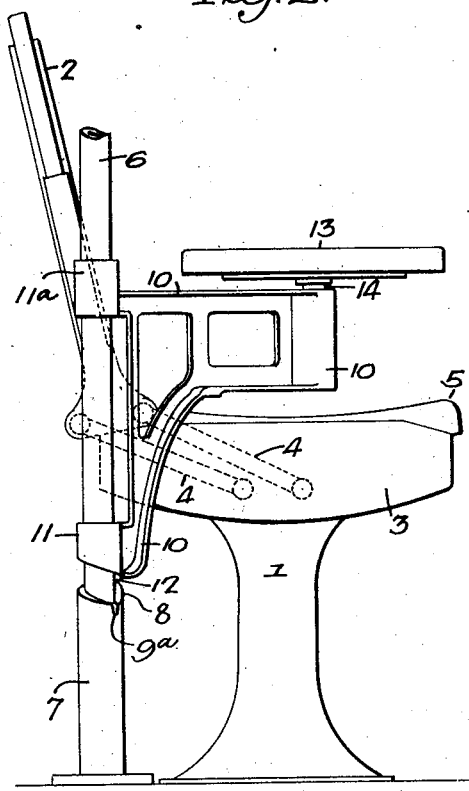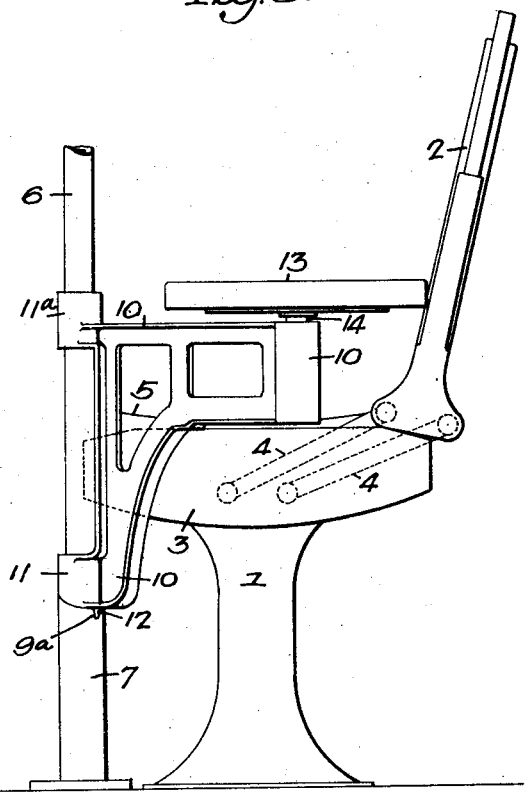

UNITED STATES PATENT OFFICE.

SAMUEL M. CURWEN, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

CAR-SEAT.

1,361,690.  Specification of Letters Patent.  Patented Dec. 7, 1920.

Application filed September 11, 1920. Serial No. 409,583.

*To all whom it may concern:*

Be it known that I, SAMUEL M. CURWEN, a citizen of the United States, residing in Philadelphia, Pennsylvania, have invented certain Improvements in Car-Seats, of which the following is a specification.

My invention relates to certain improvements in car seats, which are used by motormen in what is known as a "one man" car. In this type of car, the operating mechanism is located at each end thereof and the motorman occupies a seat in front of the passenger seats.

One object of my invention is to provide a seat for the motorman, which is elevated above an end passenger seat, entirely clear thereof, and which can be shifted by hand to a position over the seat, or can be automatically shifted to one side of the seat, which renders it available for use by the motorman, or, when he is located at the opposite end of the car, by a passenger.

A further object of the invention is to so locate and design a seat that it will be raised out of the locked position by a link connecting the passenger seat back with the frame, when the back is shifted so that it will slide and turn to a position at one side of the passenger seat.

In the accompanying drawings:

Figure 1 is a plan view of an end seat of a car illustrating my improved motorman's seat, which is shown in full lines in position to be occupied by a motorman, and in dotted lines in position to be used by a passenger;

Fig. 2 is a view in elevation, showing the end of a car seat with the motorman's seat above the passenger's seat;

Fig. 3 is a view, showing the motorman's seat lowered and at one side of the passenger seat;

Fig. 4 is a front view showing the motorman's seat above the passenger seat;

Fig. 5 is a diagrammatic front view partly in section showing the motorman's seat raised out of the locked position by the link ready to slide down the cam surface to a position at one side of the passenger seat; and Figs. 6 and 7 are perspective views of details of my invention.

Referring to the drawings, 1 is an end passenger seat of a "one man" trolley car, in the present instance. This seat has a movable back 2, which is connected to the base frame 3 by links 4 of the ordinary type, so that the back can be shifted to either side of the seat section 5, according to the direction of movement of the car.

6 is a standard, which extends from the floor of the car to the roof in the present instance. This standard is located at one end of the passenger seat 1.

On the lower portion of the standard is a bearing 7 having a cam 8 and notched at each end of the cam, as at 9—9$^a$, to hold the motorman's seat in either of its two positions.

10 is a seat bracket having sleeves 11, 11$^a$, mounted on the standard. The lower end of the sleeve 11 has a projection 12 arranged to enter either the notch 9 or 9$^a$.

Mounted on the end of the bracket 10 is a motorman's seat 13 having a screw threaded stem 14 adapted to a threaded opening in the bracket so that on turning the seat it can be adjusted vertically.

It will be noticed, on referring to Figs. 1 and 5, that the seat bracket 10 is in the path of one of the links 4 that connects the passenger seat back to the frame 3, so that when the back is shifted from the position shown in Fig. 1, the link 4 comes in contact with the bracket, lifting it to such an extent that the projection 12 will be clear of the notch 9 and, on continuing the movement of the back, the link will force the bracket to one side and it will slide by gravity from the position shown in Fig. 2 to the position shown in Fig. 3, the projection 12 entering the notch 9$^a$, locking the motorman's seat in the position shown by dotted lines clear of the passenger seat so that if desired it can be used by a passenger. When the passenger seat back is again shifted to the position shown in Fig. 1, then the operator lifts the bracket 10 and turns it into the position above the passenger seat, the projection 12 entering the notch 9, thus retaining the motorman's seat in the elevated position above the passenger seat.

I claim:

1. The combination of a car seat having a shifting back; a standard; and a motorman's seat pivoted to the standard and arranged to swing to a position above the seat section of the car seat, or to one end thereof.

2. The combination of a car seat having a back arranged to be shifted to either side; a standard at one end of the seat; a camshaped bearing at the standard; a bracket pivotally mounted on the standard and resting on the bearing; a motorman's seat carried by said bracket, said bracket being in such position above the seat section of the car seat as to be automatically moved to one end of the car seat when the back is shifted.

3. The combination of a car seat having a movable back; a standard at one end of the seat; a bracket on the standard; a motorman's seat carried thereby; a lock for retaining the motorman's seat in position over the car seat, the bracket being in such position as to be released from the lock when the back is shifted allowing the motorman's seat to assume a position at one end of the car seat.

4. The combination of a car seat having a movable back and connecting links; a standard at one end of the seat; a cam bearing at the standard and having a notch at its upper end; a bracket arranged to turn on the standard; a motorman's seat carried thereby; said bracket having a projection arranged to enter the notch in the bearing when above the car seat, one of the links lifting the bracket out of engagement with the notched bearing when the seat back is shifted, causing the motorman's seat to swing clear of the car seat.

5. The combination of a car seat having a movable back and connecting links; a standard at one end of the seat; a bearing at the standard having a cam face and notched at each end of the cam; a bracket on the standard, a motorman's seat carried by the bracket, said bracket having a projection arranged to enter either notch in the cam bearing, the bracket when over the car seat being in position to be raised clear of the notch by a link when the seat back is shifted, and moved to one side to allow it to be turned clear of the car seat as it slides down the cam.

SAMUEL M. CURWEN.